US011822435B2

(12) United States Patent
Huntley et al.

(10) Patent No.: US 11,822,435 B2
(45) Date of Patent: Nov. 21, 2023

(54) CONSOLIDATED DATA RESTORATION FRAMEWORK

(71) Applicant: BANK OF AMERICA CORPORATION, Charlotte, NC (US)

(72) Inventors: Christopher Emmanuel Huntley, Huntersville, NC (US); Musa Ajakaiye, Harrisburg, NC (US); Prasad V. Annadata, Saint Augustine, FL (US); Dnyanesh P. Ballikar, St. Johns, FL (US); Sina Bauer, Charlotte, NC (US); Jason Kenneth Bellew, Charlotte, NC (US); Timothy John Bendel, Charlotte, NC (US); David Alan Beumer, Mount Holly, NC (US); Michelle Andrea Boston, Richardson, TX (US); Lisa Julia Brown, Charlotte, NC (US); Robin J. Buck, West Palm Beach, FL (US); Brian C. Busch, Charlotte, NC (US); Salvatore Michael Certo, Charlotte, NC (US); Ramesh Naidu Chatta, Charlotte, NC (US); Lisa Michelle Cook, Charlotte, NC (US); Joseph Corbett, Matthews, NC (US); Joseph Seth Cushing, Charlotte, NC (US); Steven Paul Davidson, Waxhaw, NC (US); Shailesh Deshpande, Glen Allen, VA (US); Sevara Ergasheva, Charlotte, NC (US); Maria Ervin, Charlotte, NC (US); James Wilson Foy, Jr., Gastonia, NC (US); Noel Mary Fuller, Charlotte, NC (US); Benjamin Judson Gaines, III, Charlotte, NC (US); Candace Gordon, Jacksonville, FL (US); Jesse Antonio Hernandez, Denver, NC (US); Christine Hoagland, Belmont, NC (US); Robert Charles Hoard, Lincoln, RI (US); Michael Spiro Karafotis, Glen Allen, VA (US); Wesley Keville, Charlotte, NC (US); Sandip Kumar, Matthews, NC (US); Terri Dorinda Lail, Denver, NC (US); Mukesh Maraj, Fort Mill, SC (US); Wyatt Edward Maxey, Charlotte, NC (US); Dari Ann Mckenzie, Charlotte, NC (US); Ashley Meadows, Charlotte, NC (US); Heather Newell, Harrisburg, NC (US); Conor Mitchell Liam Nodzak, Charlotte, NC (US); Kenyell Javon Ollie, McKinney, TX (US); Jayshree G. Patel, Monroe Township, NJ (US); David John Perro, Mooresville, NC (US); Nivetha Raghavan, Matthews, NC (US); Nikhil Ram, Huntersville, NC (US); Tara Michel Ramirez, Jacksonville, FL (US); Laurie Readhead, Charlotte, NC (US); Mary Kathleen Riley, Denver, NC (US); Elizabeth Rachel Rock, Prescott, AZ (US); Angela Dawn Roose, Mooresville, NC (US); Sanjay Singeetham, Frisco, TX (US); Kyle S. Sorensen, Huntersville, NC (US); Shreyas Srinivas, Charlotte, NC (US); Constance Jones Suarez, Charlotte, NC (US); Viresh Taskar, Charlotte, NC (US); Linda Trent, Concord, NC (US); Sachin Varule, Concord, NC (US); Bradley Walton, Clover, SC (US); Christie M. Weekley, Oakboro, NC (US); Yvette Alston, Charlotte, NC (US); Ravindra Bandaru, Charlotte, NC (US); Carmen R. Barnhill, Charlotte, NC (US); Jamie Gilchrist, Charlotte, NC (US); Namrata Kaushik, Charlotte, NC (US); Fernando A. Maisonett, Charlotte, NC (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 188 days.

(21) Appl. No.: 17/367,912

US 11,822,435 B2

Page 2

(22) Filed: Jul. 6, 2021

(65) Prior Publication Data

US 2022/0004465 A1 Jan. 6, 2022

Related U.S. Application Data

(60) Provisional application No. 63/048,534, filed on Jul. 6, 2020.

(51) Int. Cl.
*G06F 11/14* (2006.01)
*G06F 11/07* (2006.01)

(52) U.S. Cl.
CPC ...... *G06F 11/1469* (2013.01); *G06F 11/0751* (2013.01); *G06F 11/0793* (2013.01); *G06F 2201/84* (2013.01); *G06F 2201/86* (2013.01)

(58) Field of Classification Search
None
See application file for complete search history.

(56) References Cited

U.S. PATENT DOCUMENTS

| 6,018,746 | A | 1/2000 | Hill et al. |
| 6,449,623 | B1 | 9/2002 | Bohannon et al. |

(Continued)

FOREIGN PATENT DOCUMENTS

WO 2017171809 A1 10/2017

*Primary Examiner* — Eddy Cheung

(74) *Attorney, Agent, or Firm* — Moore & Van Allen PLLC; Nicholas C. Russell

(57) ABSTRACT

Embodiments of the present invention provide a system for identifying occurrence of events and performing one or more actions to mitigate the impacts of the events. The system is configured for gathering data from one or more data sources of an entity, generating dataflows using the data gathered from the one or more data sources, identifying an anomaly based on one or more indicators and the dataflows, determining occurrence of an event and generating one or more propagation models associated with the event, performing event impact analysis based on the one or more propagation models, perform one or more actions to contain the event based on the one or more propagation models, identifying a last good copy of data based on the data gathered from the one or more data sources, retrieving the last good copy of data, and restoring the last good copy of data.

19 Claims, 10 Drawing Sheets

(56) References Cited

U.S. PATENT DOCUMENTS

| 7,340,645 | B1 | 3/2008 | Martin et al. |
| 7,756,833 | B2 | 7/2010 | Van Ingen et al. |
| 7,877,642 | B2 | 1/2011 | Ding et al. |
| 8,260,747 | B2 | 9/2012 | Wu et al. |
| 8,533,523 | B2 | 9/2013 | Tylutki |
| 8,621,282 | B1 | 12/2013 | Mixter et al. |
| 8,671,076 | B2 | 3/2014 | Price et al. |
| 8,903,779 | B1 | 12/2014 | Holenstein et al. |
| 9,158,633 | B2 | 10/2015 | Bish et al. |
| 9,230,001 | B2 | 1/2016 | Magdon-Ismail et al. |
| 9,450,849 | B1 | 9/2016 | Goldberg et al. |
| 9,535,800 | B1 | 1/2017 | Natanzon et al. |
| 9,621,654 | B2 | 4/2017 | Magdon-Ismail et al. |
| 9,830,223 | B1 | 11/2017 | Holenstein et al. |
| 10,235,238 | B2 | 3/2019 | Ono et al. |
| 10,268,695 | B2 | 4/2019 | Belmanu Sadananda et al. |
| 2003/0145248 | A1 | 7/2003 | Mcneil |
| 2008/0047013 | A1* | 2/2008 | Claudatos ............ G06F 21/568 726/24 |
| 2010/0058342 | A1 | 3/2010 | Machida |
| 2013/0290932 | A1 | 10/2013 | Kruglick |
| 2014/0331279 | A1 | 11/2014 | Aissi et al. |
| 2015/0178165 | A1 | 6/2015 | Cargille et al. |
| 2015/0355998 | A1 | 12/2015 | Kogan-Katz et al. |
| 2016/0092204 | A1 | 3/2016 | Katkere et al. |
| 2016/0179649 | A1 | 6/2016 | Bank et al. |
| 2016/0196187 | A1 | 7/2016 | Thakur et al. |
| 2017/0031741 | A1 | 2/2017 | Seigel |
| 2017/0055302 | A1 | 2/2017 | Wang et al. |
| 2017/0063905 | A1* | 3/2017 | Muddu ................ G06N 7/01 |
| 2017/0195183 | A1 | 7/2017 | Gershaft et al. |
| 2018/0013768 | A1 | 1/2018 | Hunt et al. |
| 2018/0173805 | A1 | 6/2018 | Landes et al. |
| 2019/0095455 | A1* | 3/2019 | Barreto ............... G06F 11/1471 |
| 2019/0121882 | A1 | 4/2019 | Bortnikov et al. |
| 2019/0166152 | A1* | 5/2019 | Steele ................. H04L 63/1441 |
| 2020/0259852 | A1 | 8/2020 | Galbraith et al. |
| 2020/0285546 | A1* | 9/2020 | Kraplanee ........... G06F 11/1466 |
| 2021/0089385 | A1* | 3/2021 | Basuta ............... G06F 11/1048 |

* cited by examiner

CONSOLIDATED DATA RESTORATION FRAMEWORK

CROSS-REFERENCE TO RELATED APPLICATIONS

This application is a U.S. Non-provisional application claiming priority to U.S. Provisional Patent Application No. 63/048,534, filed Jul. 6, 2020 titled CONSOLIDATED DATA RESTORATION FRAMEWORK, the contents of which are hereby incorporated by reference in its entirety.

FIELD

The present invention relates to a consolidated framework for restoring data after occurrence of events, and more particularly to, identifying occurrence of events within an organization and restoring data impacted by the events.

BACKGROUND

Conventional systems do not have the capability to effectively determine occurrence of events in real-time and contain the impact associated with the event. As such, there exists a need for a system to effectively monitor and identify real-time events and mitigate the impacts of the events.

BRIEF SUMMARY

The following presents a summary of certain embodiments of the invention. This summary is not intended to identify key or critical elements of all embodiments nor delineate the scope of any or all embodiments. Its sole purpose is to present certain concepts and elements of one or more embodiments in a summary form as a prelude to the more detailed description that follows.

Embodiments of the present invention address the above needs and/or achieve other advantages by providing apparatuses (e.g., a system, computer program product and/or other devices) and methods for identifying occurrence of events and performing one or more actions to mitigate the impacts of the events. The system embodiments may comprise one or more memory devices having computer readable program code stored thereon, a communication device, and one or more processing devices operatively coupled to the one or more memory devices, wherein the one or more processing devices are configured to execute the computer readable program code to carry out the invention. In computer program product embodiments of the invention, the computer program product comprises at least one non-transitory computer readable medium comprising computer readable instructions for carrying out the invention. Computer implemented method embodiments of the invention may comprise providing a computing system comprising a computer processing device and a non-transitory computer readable medium, where the computer readable medium comprises configured computer program instruction code, such that when said instruction code is operated by said computer processing device, said computer processing device performs certain operations to carry out the invention.

In some embodiments, the present invention gathers data from one or more data sources of an entity, generates one or more dataflows using the data gathered from the one or more data sources, identifies an anomaly based on one or more indicators and the one or more dataflows, in response to identifying the anomaly, determines occurrence of an event and generates one or more propagation models (or otherwise access one or more stored propagation models for the data) associated with the event, performs event impact analysis based on the one or more propagation models, performs one or more actions to contain the event based on the one or more propagation models, identifies a last good copy of data based on the data gathered from the one or more data sources, retrieves the last good copy of data, and restores the last good copy of data.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
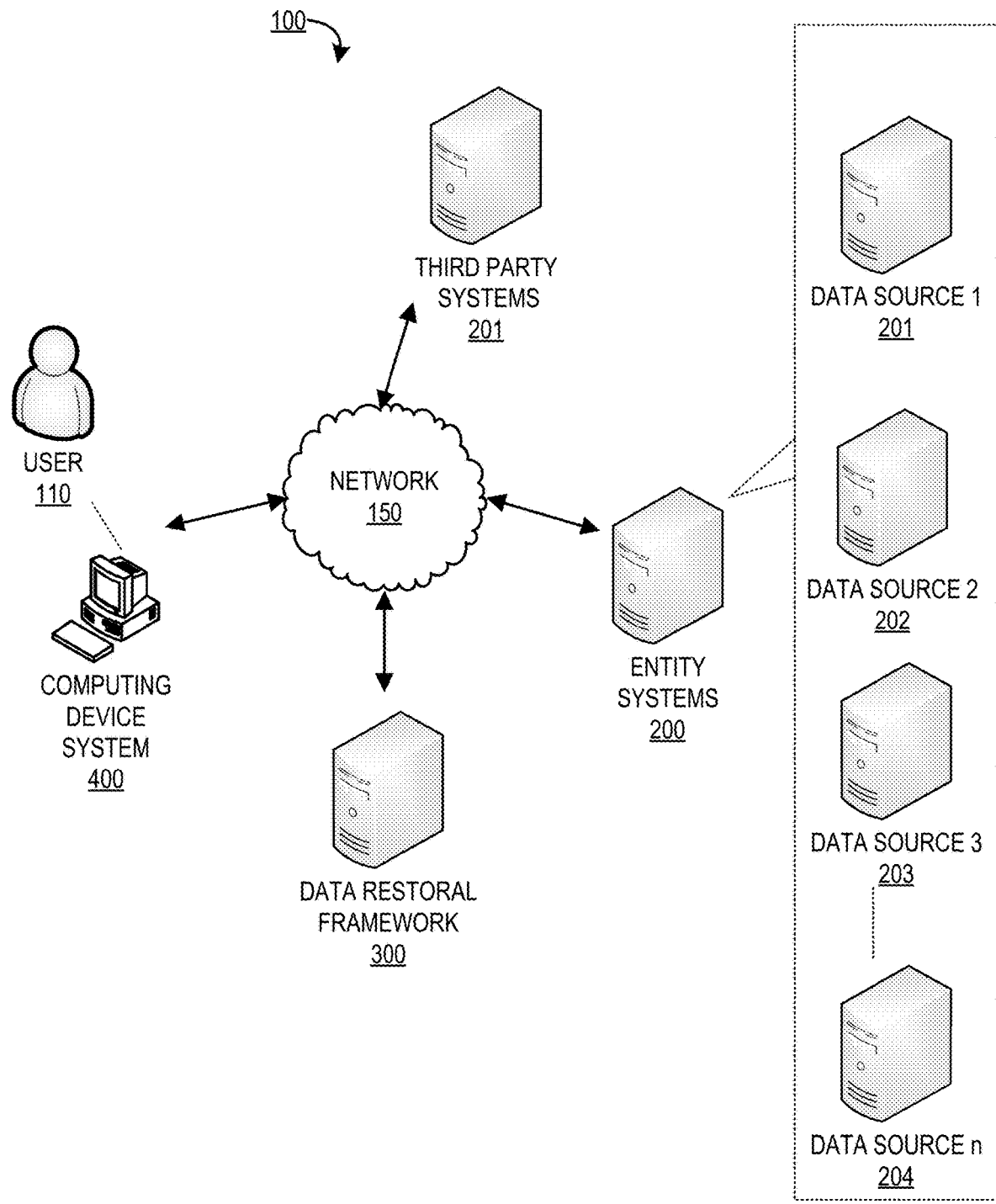
Figure 2:
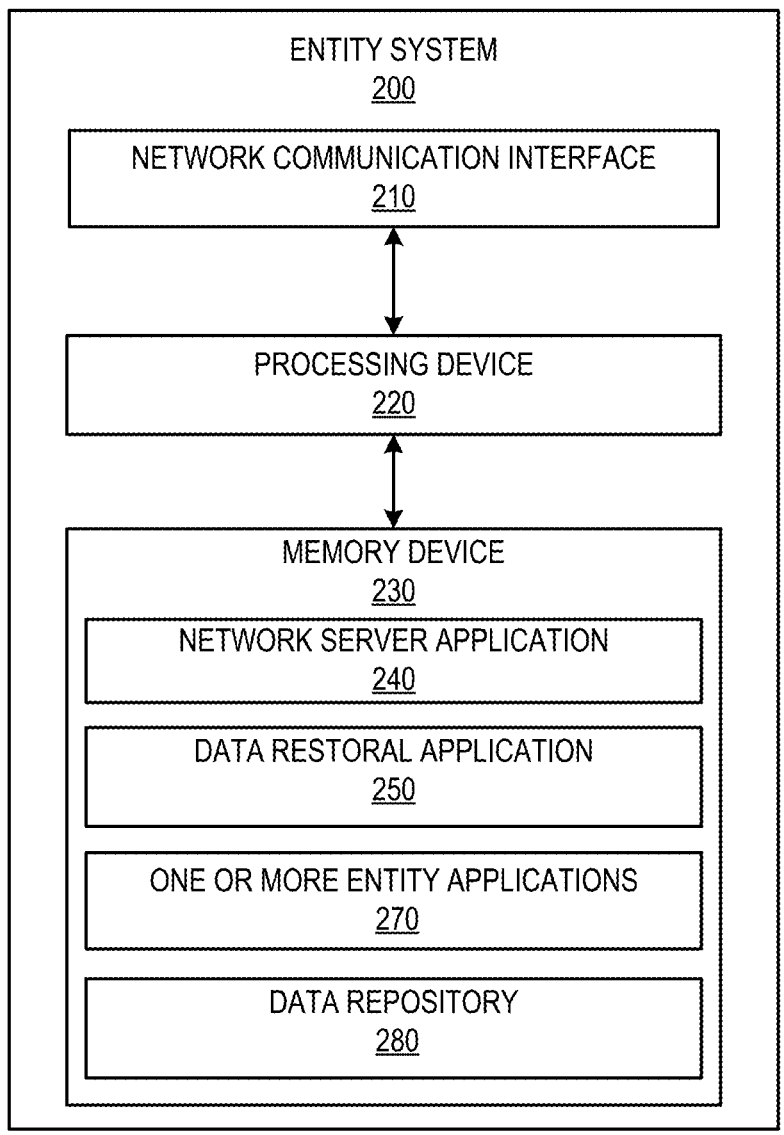
Figure 3:
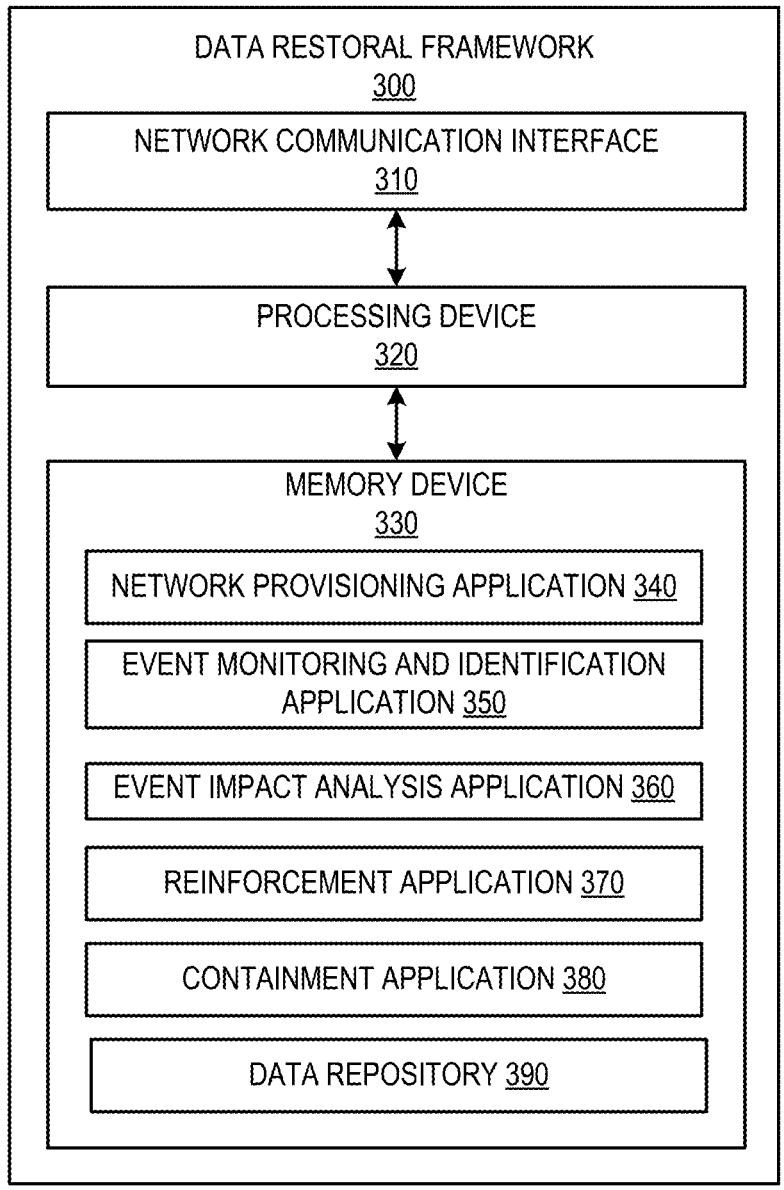
Figure 4:
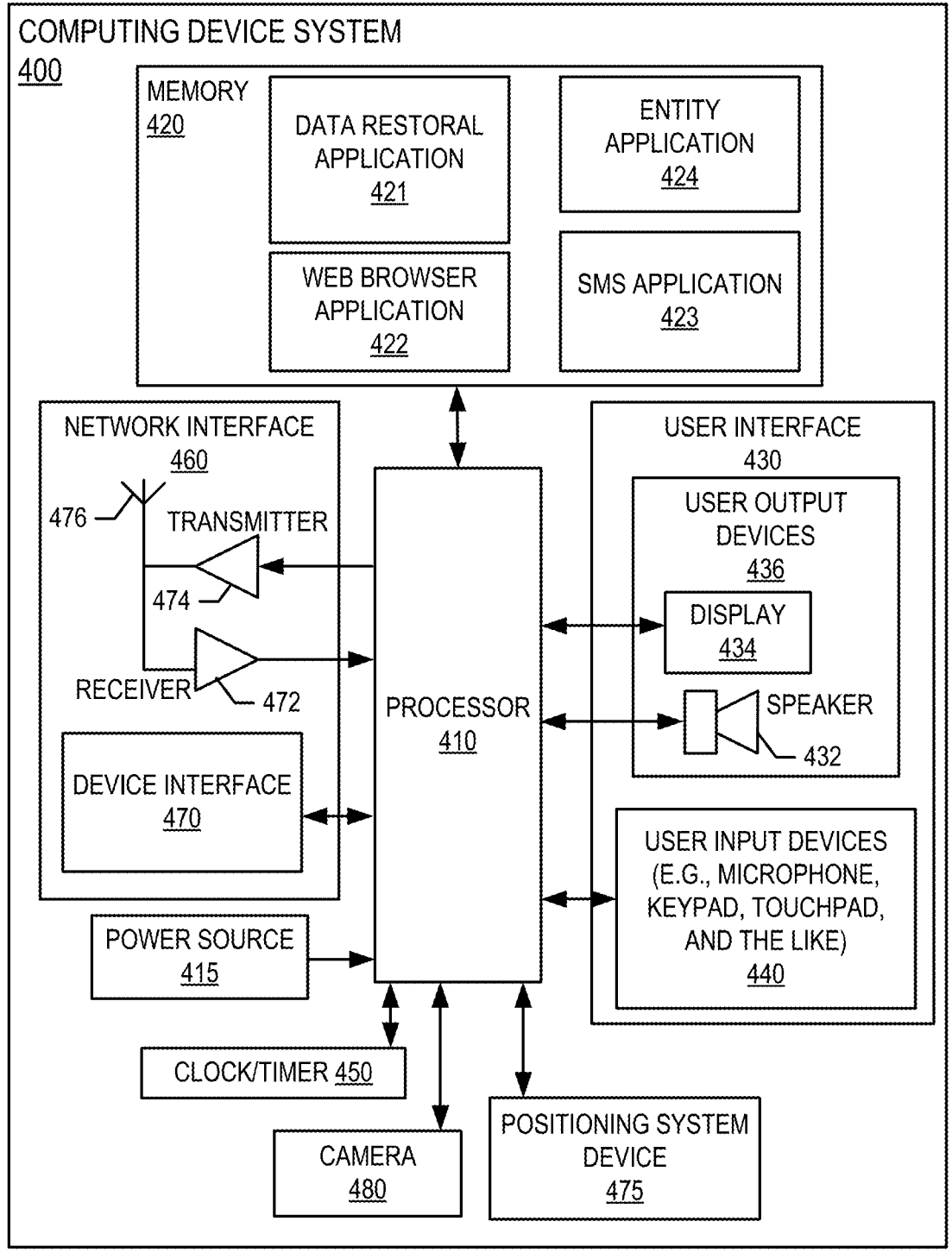
Figure 5:
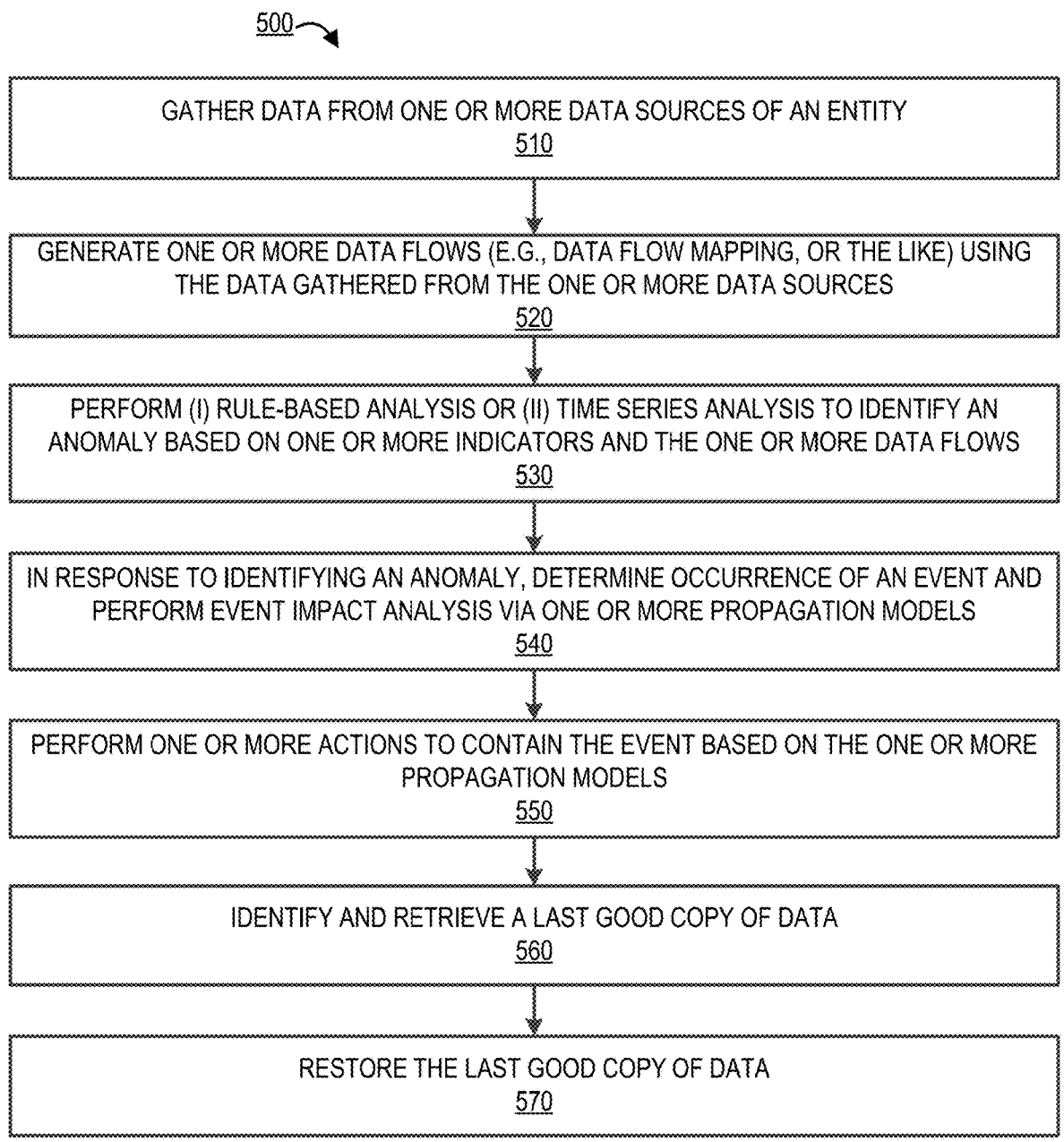
Figure 6:
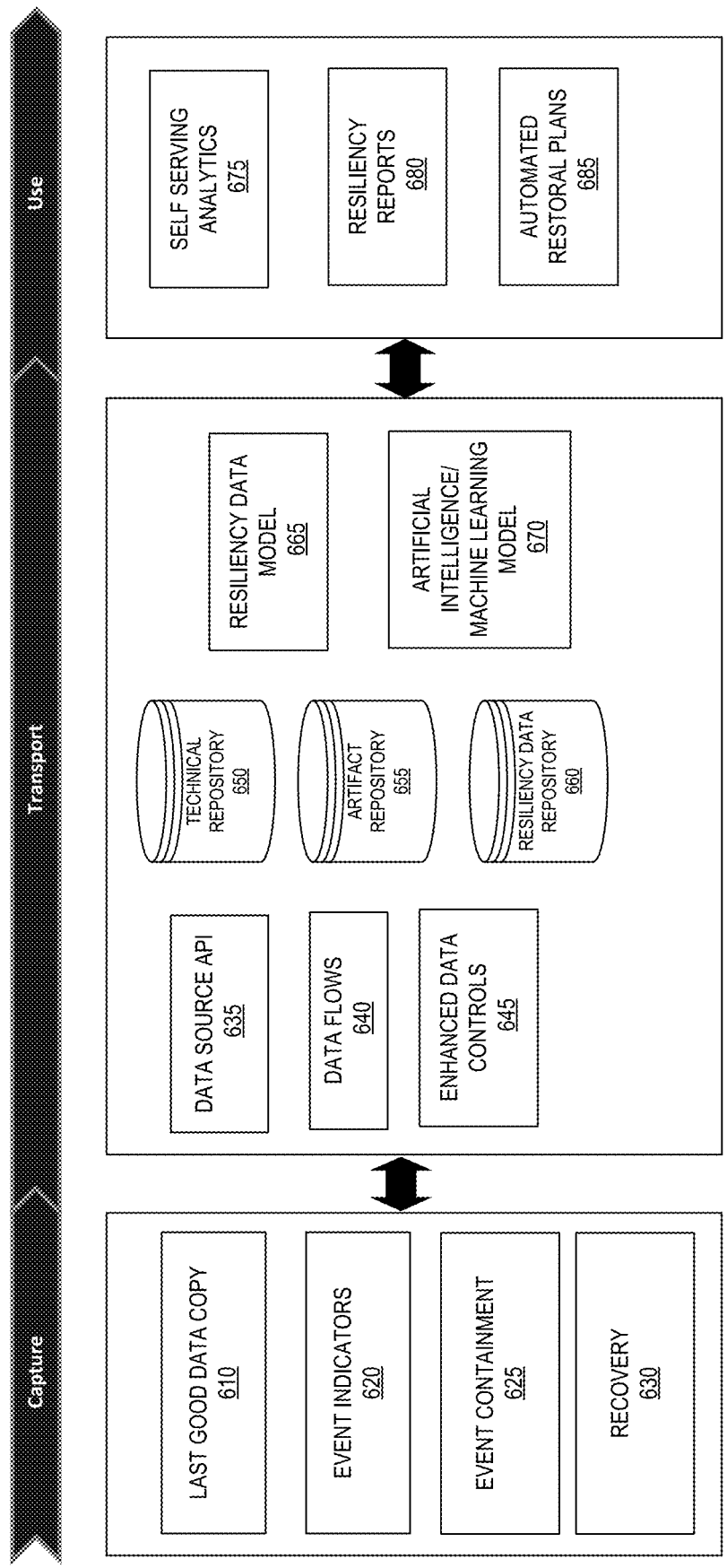
Figure 7A:
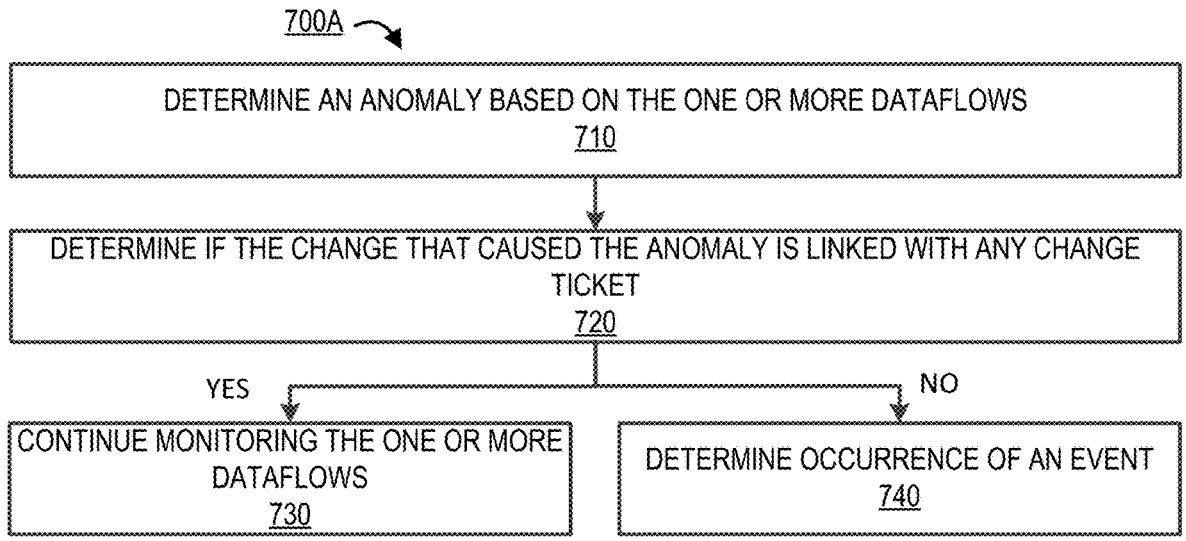
Figure 7B:
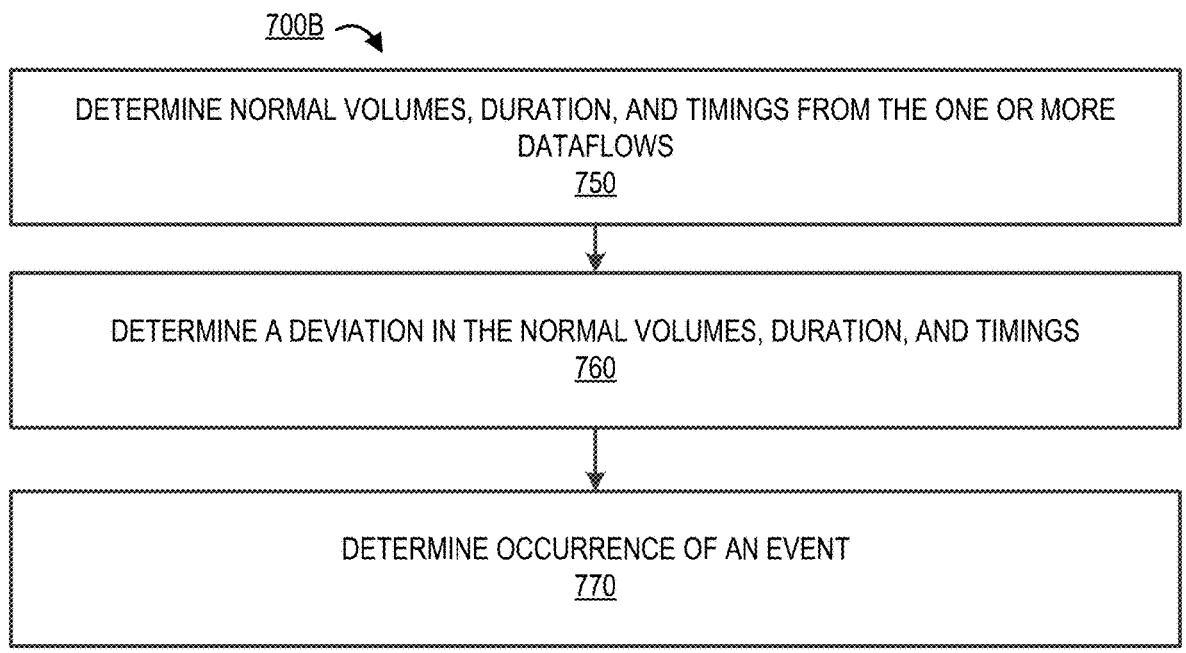
Figure 8:
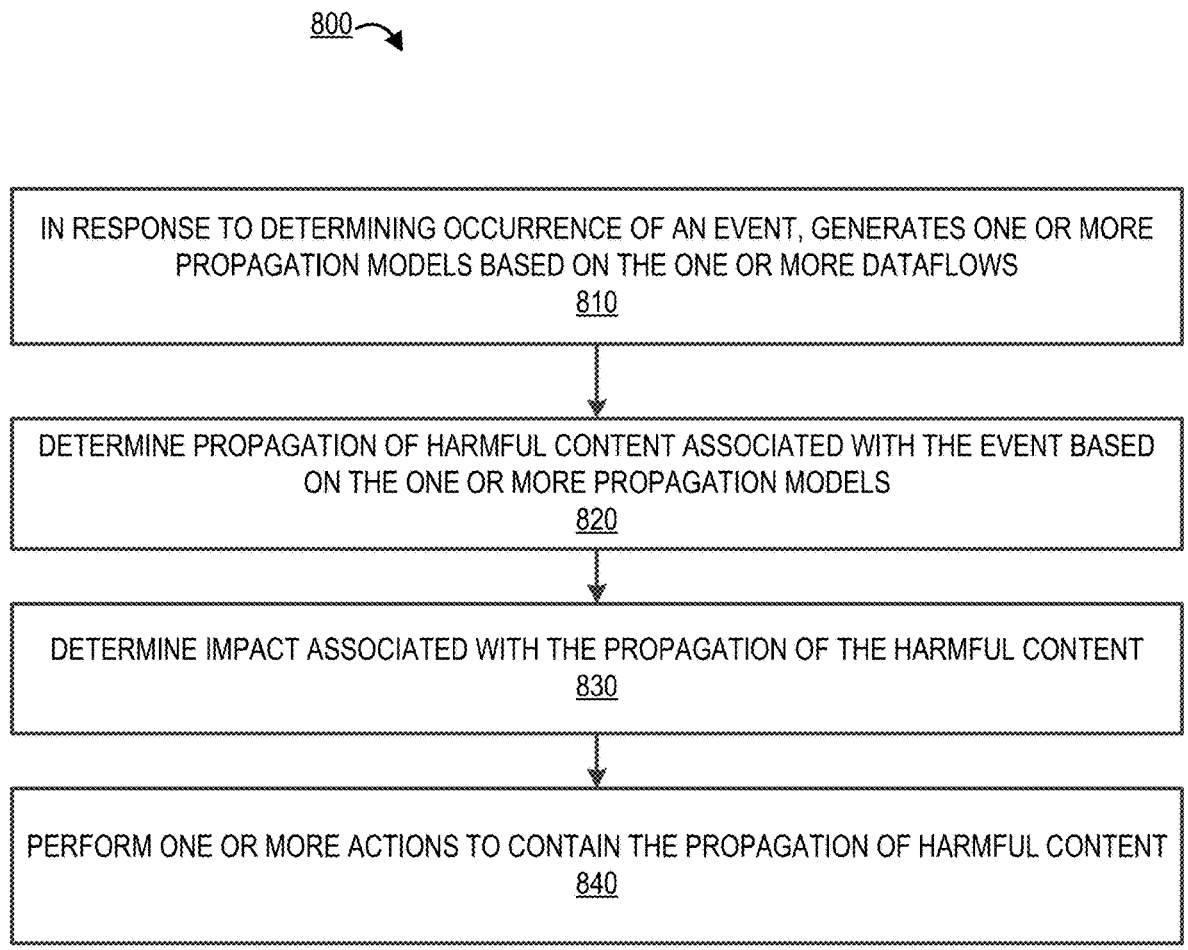
Figure 9:
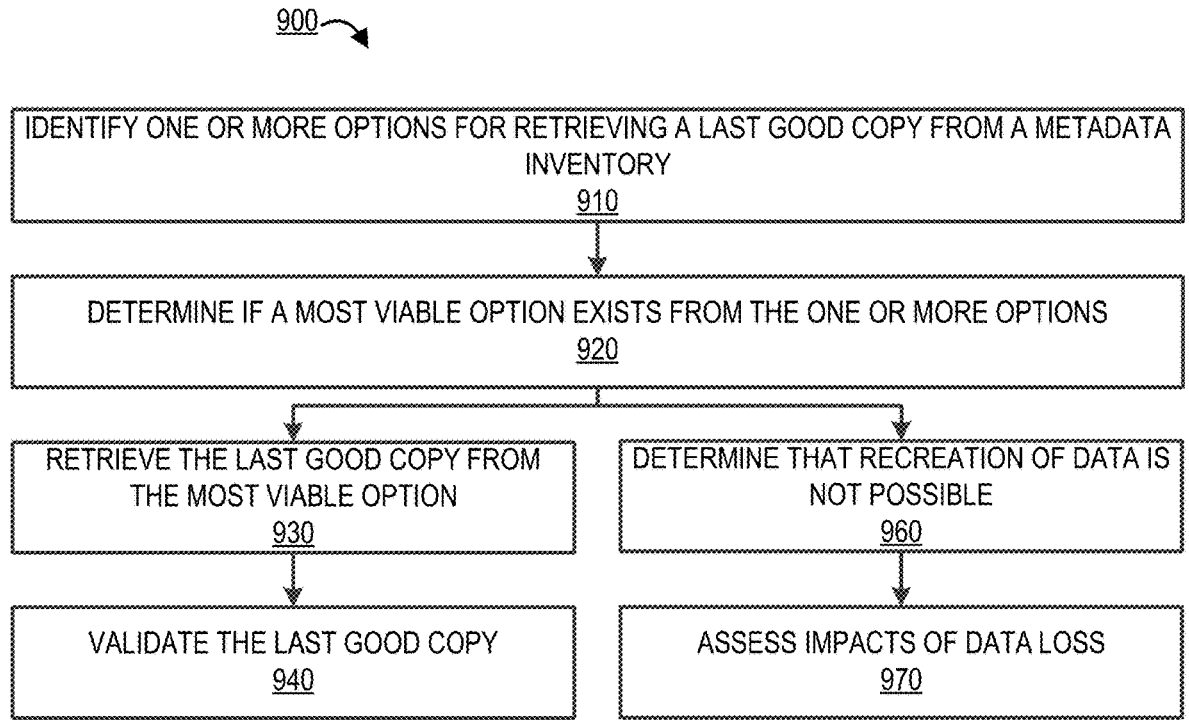
Figure 10:
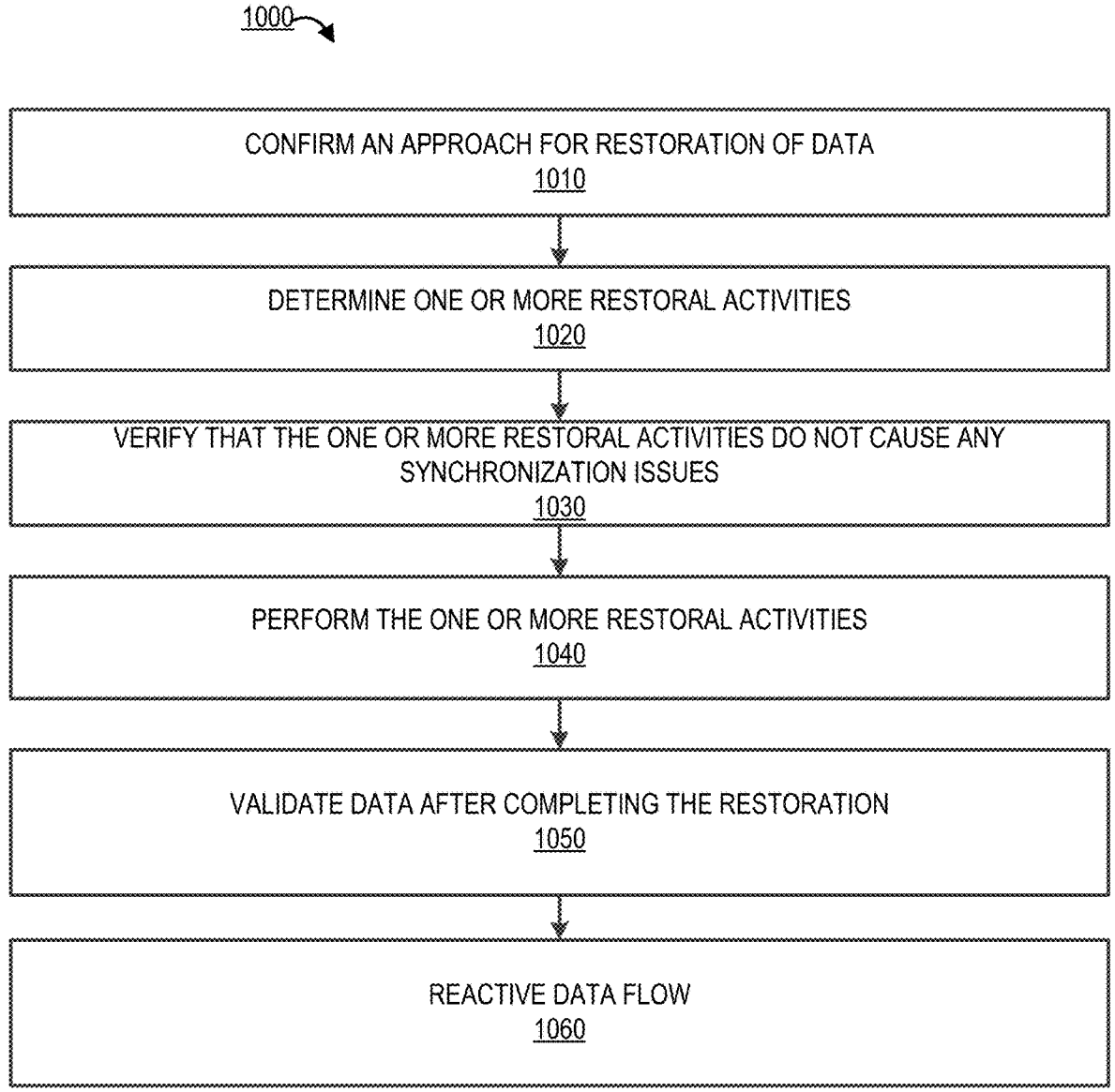

Having thus described embodiments of the invention in general terms, reference will now be made the accompanying drawings, wherein:

FIG. 1 provides a block diagram illustrating a system environment for identifying occurrence of events and performing one or more actions to mitigate the impacts of the events, in accordance with an embodiment of the invention;

FIG. 2 provides a block diagram illustrating the entity system 200 of FIG. 1, in accordance with an embodiment of the invention;

FIG. 3 provides a block diagram illustrating a data restoral framework 300 of FIG. 1, in accordance with an embodiment of the invention;

FIG. 4 provides a block diagram illustrating the computing device system 400 of FIG. 1, in accordance with an embodiment of the invention;

FIG. 5 provides a flowchart illustrating a process flow for identifying occurrence of events and performing one or more actions to mitigate the impacts of the events, in accordance with an embodiment of the invention;

FIG. 6 illustrates a block diagram for identifying occurrence of events and performing one or more actions to mitigate the impacts of the events, in accordance with an embodiment of the invention;

FIGS. 7A and 7B provide flowcharts illustrating process flows for determining occurrence of one or more events, in accordance with an embodiment of the invention;

FIG. 8 provides a flowchart illustrating the process flow for containing the impact of the one or more events, in accordance with an embodiment of the invention;

FIG. 9 provides a flowchart illustrating the process flow for identifying and retrieving a last good copy, in accordance with an embodiment of the invention; and FIG. 10 provides a flowchart illustrating the process flow for restoring data using the last good copy, in accordance with an embodiment of the invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

In accordance with embodiments of the invention, the term "entity" may include any financial organization that processes financial transactions including, but not limited to, banks, credit unions, savings and loan associations, investment companies, stock brokerages, management firms, insurance companies and the like. In accordance with some other embodiments of the invention, the term "entity" may include any non-financial organization that utilizes one or more entity systems to perform one or more organizational activities, where the one or more entity systems hold critical data associated with the organization. In accordance with embodiments of the invention, the terms "third party system" and "other third party systems" may include any organization that provide one or more resources including, but not limited to, data, one or more hardware/software components, or the like to the entity. Furthermore, embodiments of the present invention use the term "user." In accordance with embodiments of the invention, a user may be an employee, officer, agent, consultant, or the like of the entity or the third-party, or an individual user action on his/or own behalf.

In accordance with embodiments of the invention, the term "resource" may be a system, an application, a document, or the like associated with the entity. In specific embodiments of the invention, the resource may be an application utilized, managed, and/or developed by the entity. In some embodiments of the invention, the resource may be a server. In some embodiments of the invention, the resource may be a database.

In accordance with embodiments of the invention, the term "event" may be any event that disrupts the normal operation of the one or more resources. In some embodiments, the event may be a security related event (e.g., unauthorized data modification event, unauthorized data access event, unauthorized data transfer event, an unauthorized data corruption event, or other like event).

Many of the example embodiments and implementations described herein contemplate interactions engaged in by a user with a computing device and/or one or more communication devices and/or secondary communication devices. A "user", as referenced herein may refer to a user acting on behalf of an entity or acting individually, which has the ability and/or authorization to access and use one or more resources or portions of a resource. Additionally, an "unauthorized user" may be a user that does not have authorization to access and use one or more resources or portions of a resource. Furthermore, as used herein, the term "user computing device" or "mobile device" may refer to mobile phones, computing devices, tablet computers, wearable devices, smart devices and/or any portable electronic device capable of receiving and/or storing data therein.

A "user interface" is any device or software that allows a user to input information, such as commands or data, into a device, or that allows the device to output information to the user. For example, the user interface include a graphical user interface (GUI) or an interface to input computer-executable instructions that direct a processing device to carry out specific functions. The user interface typically employs certain input and output devices to input data received from a user second user or output data to a user. These input and output devices may include a display, mouse, keyboard, button, touchpad, touch screen, microphone, speaker, LED, light, joystick, switch, buzzer, bell, and/or other user input/output device for communicating with one or more users.

Systems, methods, and computer program products are described herein for a system that identifies occurrence of events and performs one or more actions to mitigate the impacts of the events. The invention aids in quick and efficient identification and restoration of one or more resources impacted by the event and allows the organizational activities to return to normal.

FIG. 1 provides a block diagram illustrating a system environment 100 for identifying occurrence of events and performing one or more actions to mitigate the impacts of the events, in accordance with an embodiment of the invention. As illustrated in FIG. 1, the environment 100 includes a data restoral framework 300, entity system 200, a computing device system 400, and third party systems 120. One or more users 110 may be included in the system environment 100, where the users 110 interact with the other systems of the system environment 100 via a user interface of the computing device system 400.

The entity system(s) 200 may be any system owned or otherwise controlled by an entity to support or perform one or more process steps described herein. In some embodiments, the managing entity is a financial institution. In some embodiments, the managing entity is a non-financial institution. In some embodiments, the entity system(s) 200 may comprise one or more independent systems (e.g., data source '1' 201, data source '2' 202, data source '3' 203, through data source 'n' 204) that manage and/or host one or more applications, databases, or the like. In some embodiments, the one or more users 110 may be employees of the entity associated with the entity system 200.

Third party systems 120 may be any systems that provide one or more resources to the entity. In some embodiments, the third party systems 120 may be a system that provides an application to the entity. In some embodiments, the third party systems 120 may be a system that provides a server to the entity. In some embodiments, the third party systems 120 may be a system that provides a database to the entity.

The data restoral framework 300 is a system of the present invention for performing one or more process steps described herein. In some embodiments, the data restoral framework 300 may be an independent system. In some embodiments, the data restoral framework 300 may be a part of the entity system 200.

The data restoral framework 300, the entity system 200, the computing device system 400, and/or the third party systems 120 may be in network communication across the system environment 100 through the network 150. The network 150 may include a local area network (LAN), a wide area network (WAN), and/or a global area network (GAN). The network 150 may provide for wireline, wireless, or a combination of wireline and wireless communication between devices in the network. In one embodiment, the network 150 includes the Internet. In general, the data restoral framework 300 is configured to communicate information or instructions to, or receive information or instructions from, the entity system 200, the computing device system 400, and/or the third party systems 120 across the network 150.

The computing device system 400 may be a system owned or controlled by the entity of the entity system 200 and/or the user 110. As such, the computing device system 400 may be a computing device of the user 110. In general, the computing device system 400 communicates with the user 110 via a user interface of the computing device system 400, and in turn is configured to communicate information or instructions to, or receive information or instructions from, the data restoral framework 300, entity system 200, and/or the third party systems 120 across the network 150. The user 110 and the computing device system 400 associated therewith, may be authorized users and authorized computing device systems or unauthorized users and unauthorized computing device systems.

FIG. 2 provides a block diagram illustrating the entity system 200, in greater detail, in accordance with embodiments of the invention. As illustrated in FIG. 2, in one embodiment of the invention, the entity system 200 includes one or more processing devices 220 operatively coupled to a network communication interface 210 and a memory device 230. In certain embodiments, the entity system 200 is operated by a first entity, such as a financial institution, while in other embodiments, the entity system 200 is operated by an entity other than a financial institution.

It should be understood that the memory device 230 may include one or more databases or other data structures/repositories. The memory device 230 also includes computer-executable program code that instructs the processing device 220 to operate the network communication interface 210 to perform certain communication functions of the entity system 200 described herein. For example, in one embodiment of the entity system 200, the memory device 230 includes, but is not limited to, a data restoral application 250, one or more resource applications 270, and a data repository 280. The computer-executable program code of the network server application 240, the data restoral application 250, the one or more resource applications 270, to perform certain logic, data-extraction, and data-storing functions of the entity system 200 described herein, as well as communication functions of the entity system 200.

The network server application 240, the data restoral application 250, the one or more resource applications 270, are configured to store data in the data repository 280 or to use the data stored in the data repository 280 when communicating through the network communication interface 210 with the data restoral framework 300, the computing device system 400, and/or the third party systems 120 to perform one or more process steps described herein. In some embodiments, the data repository 280 comprises information associated with one or more resources of the entity. In some embodiments, the entity system 200 may receive instructions from the data restoral framework 300 via the data restoral application 250 to perform certain operations. The data restoral application 250 may be provided by the data restoral framework 300, and as such the data restoral application 250 be located on data restoral framework 300, a portion may be located on the data restoral framework 300 and a portion may be located on the entity systems 200, or the data restoral application 250 may communicate with the data restoral framework 300. The one or more resource applications 270 may be any of the applications used, created, modified, and/or managed by the entity system 200.

FIG. 3 provides a block diagram illustrating the data restoral framework 300 in greater detail, in accordance with embodiments of the invention. As illustrated in FIG. 3, in one embodiment of the invention, the data restoral framework 300 includes one or more processing devices 320 operatively coupled to a network communication interface 310 and a memory device 330. In certain embodiments, the data restoral framework 300 is operated by a first entity, such as a financial institution, while in other embodiments, the data restoral framework 300 is operated by an entity other than a financial institution. In some embodiments, the data restoral framework 300 is owned or operated by the entity of the entity system 200. In some embodiments, the data restoral framework 300 may be an independent system. In alternate embodiments, the data restoral framework 300 may be a part of the entity system 200.

It should be understood that the memory device 330 may include one or more databases or other data structures/repositories. The memory device 330 also includes computer-executable program code that instructs the processing device 320 to operate the network communication interface 310 to perform certain communication functions of the data restoral framework 300 described herein. For example, in one embodiment of the data restoral framework 300, the memory device 330 includes, but is not limited to, a network provisioning application 340, an event monitoring and identification application 350, an event impact analysis application 360, a reinforcement application 370, a containment application 380, and a data repository 390 comprising data processed or accessed by one or more applications in the memory device 330. The computer-executable program code of the network provisioning application 340, the event monitoring and identification application 350, the event impact analysis application 360, the reinforcement application 370, and the containment application 380 may instruct the processing device 320 to perform certain logic, data-processing, and data-storing functions of the data restoral framework 300 described herein, as well as communication functions of the data restoral framework 300.

The network provisioning application 340, the event monitoring and identification application 350, the event impact analysis application 360, the reinforcement application 370, and the containment application 380 are configured to invoke or use the data in the data repository 390 when communicating through the network communication interface 310 with the entity system 200, the computing device system 400, and/or the third party systems 120. In some embodiments, the network provisioning application 340, the event monitoring and identification application 350, the event impact analysis application 360, the reinforcement application 370, and the containment application 380 may store the data extracted or received from the entity system 200, the third party system 120, and the computing device system 400 in the data repository 390. In some embodiments, the network provisioning application 340, the event monitoring and identification application 350, the event impact analysis application 360, the reinforcement application 370, and the containment application 380 may be a part of a single application. The functionalities provided by the event monitoring and identification application 350 are explained in FIGS. 7A and 7B. The event impact analysis application 360 performs event impact analysis as explained in FIG. 8. The reinforcement application 370 reinforces the integrity of the resources by identifying a last good copy of data as explained in FIG. 9 and the containment application 380 contains the propagation of harmful content associated with the event and also restores the one or more resources using the last good copy provided by the reinforcement application 370 as explained in FIG. 10. In some embodiments, the event monitoring and identification application 350, the event impact analysis application 360, the reinforcement application 370, and the containment application 380 may leverage an artificial intelligence engine/machine learning models to performs one or more tasks described herein.

FIG. 4 provides a block diagram illustrating a computing device system 400 of FIG. 1 in more detail, in accordance with embodiments of the invention, such as a desktop, laptop or mobile computing device (e.g., smartphone, or the like). However, it should be understood that a mobile smartphone is merely illustrative of one type of computing device system 400 that may benefit from, employ, or otherwise be involved with embodiments of the present invention and, therefore, should not be taken to limit the scope of embodiments of the present invention. Other types of computing devices may include portable digital assistants (PDAs), pagers, mobile televisions, entertainment devices, desktop computers, workstations, laptop computers, cameras, video recorders, audio/video player, radio, GPS devices, wearable devices, Internet-of-things devices, augmented reality devices, virtual reality devices, automated teller machine devices, electronic kiosk devices, or any combination of the aforementioned.

Some embodiments of the computing device system 400 include a processor 410 communicably coupled to such devices as a memory 420, user output devices 436, user input devices 440, a network interface 460, a power source 415, a clock or other timer 450, a camera 480, and a positioning system device 475. The processor 410, and other processors described herein, generally include circuitry for implementing communication and/or logic functions of the computing device system 400. For example, the processor 410 may include a digital signal processor device, a microprocessor device, and various analog to digital converters, digital to analog converters, and/or other support circuits. Control and signal processing functions of the computing device system 400 are allocated between these devices according to their respective capabilities. The processor 410 thus may also include the functionality to encode and interleave messages and data prior to modulation and transmission. The processor 410 can additionally include an internal data modem. Further, the processor 410 may include functionality to operate one or more software programs, which may be stored in the memory 420. For example, the processor 410 may be capable of operating a connectivity program, such as a web browser application 422. The web browser application 422 may then allow the computing device system 400 to transmit and receive web content, such as, for example, location-based content and/or other web page content, according to a Wireless Application Protocol (WAP), Hypertext Transfer Protocol (HTTP), and/or the like.

The processor 410 is configured to use the network interface 460 to communicate with one or more other devices on the network 150. In this regard, the network interface 460 includes an antenna 476 operatively coupled to a transmitter 474 and a receiver 472 (together a "transceiver"). The processor 410 is configured to provide signals to and receive signals from the transmitter 474 and receiver 472, respectively. The signals may include signaling information in accordance with the air interface standard of the applicable cellular system of the wireless network 152. In this regard, the computing device system 400 may be configured to operate with one or more air interface standards, communication protocols, modulation types, and access types. By way of illustration, the computing device system 400 may be configured to operate in accordance with any of a number of first, second, third, and/or fourth-generation communication protocols and/or the like.

As described above, the computing device system 400 has a user interface that is, like other user interfaces described herein, made up of user output devices 436 and/or user input devices 440. The user output devices 436 include a display 430 (e.g., a liquid crystal display or the like) and a speaker 432 or other audio device, which are operatively coupled to the processor 410.

The user input devices 440, which allow the computing device system 400 to receive data from a user such as the user 110, may include any of a number of devices allowing the computing device system 400 to receive data from the user 110, such as a keypad, keyboard, touch-screen, touchpad, microphone, mouse, joystick, other pointer device, button, soft key, and/or other input device(s). The user interface may also include a camera 480, such as a digital camera.

The computing device system 400 may also include a positioning system device 475 that is configured to be used by a positioning system to determine a location of the computing device system 400. For example, the positioning system device 475 may include a GPS transceiver. In some embodiments, the positioning system device 475 is at least partially made up of the antenna 476, transmitter 474, and receiver 472 described above. For example, in one embodiment, triangulation of cellular signals may be used to identify the approximate or exact geographical location of the computing device system 400. In other embodiments, the positioning system device 475 includes a proximity sensor or transmitter, such as an RFID tag, that can sense or be sensed by devices known to be located proximate a merchant or other location to determine that the computing device system 400 is located proximate these known devices.

The computing device system 400 further includes a power source 415, such as a battery, for powering various circuits and other devices that are used to operate the computing device system 400. Embodiments of the computing device system 400 may also include a clock or other timer 450 configured to determine and, in some cases, communicate actual or relative time to the processor 410 or one or more other devices.

The computing device system 400 also includes a memory 420 operatively coupled to the processor 410. As used herein, memory includes any computer readable medium (as defined herein below) configured to store data, code, or other information. The memory 420 may include volatile memory, such as volatile Random Access Memory (RAM) including a cache area for the temporary storage of data. The memory 420 may also include non-volatile memory, which can be embedded and/or may be removable. The non-volatile memory can additionally or alternatively include an electrically erasable programmable read-only memory (EEPROM), flash memory or the like.

The memory 420 can store any of a number of applications which comprise computer-executable instructions/code executed by the processor 410 to implement the functions of the computing device system 400 and/or one or more of the process/method steps described herein. For example, the memory 420 may include such applications as a conventional web browser application 422, a data restoral application 421, entity application 424. These applications also typically instructions to a graphical user interface (GUI) on the display 430 that allows the user 110 to interact with the entity system 200, the data restoral framework 300, and/or other devices or systems. The memory 420 of the computing device system 400 may comprise a Short Message Service (SMS) application 423 configured to send, receive, and store data, information, communications, alerts, and the like via the wireless telephone network 152. In some embodiments, the data restoral application 421 provided by the data restoral framework 300 allows the user 110 to access the data restoral framework 300. In some embodiments, the entity application 424 provided by the entity system 200 and the data restoral application 421 provided by the data restoral framework 300 allow the user 110 to access the functionalities provided by the data restoral framework 300 and the entity system 200.

The memory 420 can also store any of a number of pieces of information, and data, used by the computing device system 400 and the applications and devices that make up the computing device system 400 or are in communication with the computing device system 400 to implement the functions of the computing device system 400 and/or the other systems described herein.

FIG. 5 provides a flowchart illustrating a high-level process flow 500 for identifying occurrence of events and performing one or more actions to mitigate the impacts of the events, in accordance with an embodiment of the invention. FIG. 5 provides a general process, which will be discussed in further detail with respect to FIGS. 6 through 10.

As shown in block 510, the system gathers data from one or more data sources of the entity. One or more data sources may comprise one or more applications, one or more servers, one or more data repositories, or the like of the entity. Some examples of the one or more data sources may include, but are not limited to, enterprise technology research tools, business analyst tools, enterprise data registry application, enterprise data incident management tools, enterprise insurance management systems, information technology service management systems, cyber security tools, network performance management applications, enterprise data governance management applications, testing applications, or any other applications used by the entity. In some embodiments, the system automatically gathers data from the one or more data sources. In some embodiments, after the initial collection of data from the one or more data sources, the system also continuously gathers data from the one or more data sources in real-time (e.g., instantaneously, near-time, such as within seconds, or the like). It should be understood that any type of data may be gathered, however, in particular the data may relate to financial, account, customer, or other like data related to interactions facilitated by and/or resource (e.g., funds) held by a financial institution. Alternatively, or additionally, the data may relate to the operations of systems within an entity, which may be used to operate activities of the entity. In some embodiments, the data gathered from the one or more data sources may be network sensor data.

As shown in block 520, the system generates one or more dataflows (e.g., data flow mapping, representations of the movement of data, or the like) using the data gathered from the one or more data sources. The one or more dataflows generated by the system may be directional maps that provide an understanding of the flow of data between one or more resources of the entity. In some embodiments, the system uses evidence based data mapping technique to generate the one or more dataflows. The dataflows may illustrate (e.g., graphically, using metadata, pointers, or the like) how data moves throughout the entity resources. For example, the dataflows may illustrate how data moves between applications, the interdependencies of the data (e.g., what applications rely on what data, and the locations of the origin and subsequent locations for the data), the timing of the flow of data (e.g., when data is transferred, updated, backed-up, uploaded, downloaded, or the like), the frequency of data movement (e.g., multiple times an hour, day, week, or the like), the volume of the data being shared, or the like. The dataflows may provide individual flows of particular types of data and/or the flows of aggregated data. It should be understood that when complied the flow of different data may be reviewed through the use of filters that allow a user to review different slices of the flow of data (e.g., individual data or aggregated data) based on a user (e.g., administrator or group responsible for the data), an application, a system, a business unit, a domain, importance (e.g., critical to the entity operations), timing (e.g., data transferred at a particular day and/or time), origin (e.g., where the data is first held), destination (e.g., the more or locations to which the dataflows), internal (e.g., data that only flows internally), external (e.g., data that is provided to third parties), country (e.g., from where the data came or to which the data is sent), incident (e.g., where data corruption has been identified in the past or present), or other like level, or combinations of levels in order to view the data flow in any number of cross-slices within the entity. It should be understood that the generation of the one or more dataflows will aid in creating the one or more propagation models discussed in further detail herein.

As shown in block 530, the system identifies an anomaly based on one or more indicators and the one or more dataflows. In some embodiments, the system may identify an anomaly and occurrence of an event based on performing rule-based analysis. The process flow associated with performing rule-based analysis to determine occurrence of an event is explained in detail with respect to FIG. 7A. In some other embodiments, the system may identify an anomaly and occurrence of an event based on performing time series analysis. The process flow associated with performing time series analysis to determine occurrence of an event is explained in detail with respect to FIG. 7B.

As shown in block 540, the system in response to identifying an anomaly, determines occurrence of an event in real-time and performs event impact analysis via one or more propagation models. One or more propagation models generated by the system provide an insight into propagation of harmful content (e.g., whether or not such harmful content was intended by a malicious user or unintentionally occurred) upon occurrence of an event. The process flow associated with performing event impact analysis is explained in greater detail in FIG. 8. Examples of the event may be data corruption, unauthorized data modification event, data breach, data loss, or the like that occurs as a result of the invention that includes harmful content. Harmful content may be any malicious code such as a malware, trojan horse, ransomware, spyware, adware, keystroke logging, virus, or the like that cause data breaches, data corruption, or the like. Harmful content may enter into a resource and may have the capability to replicate and also propagate to one or more resources of the entity, thereby impacting organizational activities of the entity.

In response to identifying the occurrence of an event in real-time, the system performs one or more actions to contain the event based on the one or more propagation models, as shown in block 550. Upon determining a path associated with propagation of harmful content, the system performs one or more actions to contain the propagation of harmful content. The one or more actions may include, but are not limited to, generating one or more alerts, decommissioning high impact resources, bringing alternate or back-up resources online, diverting operations to other resources, modifying propagation frequency associated with the one or more resources, performing upstream tracing using one or more reverse propagation models to identify the initial impact of the event, or the like. The one or more actions are explained in greater detail in FIG. 8.

Next, as shown in block 560, the system identifies and retrieves a last good copy of data affected by the harmful content, such as a last good copy of data that has been corrupted by the harmful content. Last good copy of the data may be an instance of data that was not affected by the event. In other words, last good copy of the data is an instance that was saved by the system or any of the entity systems or third party systems, upstream, downstream one parallel resources, or the like, before the occurrence of the event. The process flow associated with retrieving the last good copy is explained in greater detail in FIG. 9. As shown in block 570, in response to retrieving the last good copy of data, the system restores the last good copy of the data. The process flow associated with restoring the last good copy is explained in greater detail in FIG. 10.

FIG. 6 illustrates a block diagram 600 for identifying occurrence of events and performing one or more actions to mitigate the impacts of the events, in accordance with an embodiment of the invention. The system of the present invention in the capture phase, gathers data from the one or more data sources, where the one or more data sources comprise last good data copy data sources 610 that provide information associated with the last good data copy, event indicator data sources 620 that provide information associated with indicators that help identify the occurrence of events, event containment data sources 625 provide information associated with containing the event, and recovery data sources 630 that provide information associated with recovering and restoring data allowing the organization activities to return to normal. After gathering the data from the one or more data sources, in the transport phase, the data source Application Programming Interface (API) 635 receives the data gathered from the one or more data sources. The data source API may also continuously gather data from the one or more data sources in real-time. Using the data from the one or more data sources, the system performs data mapping to generate one or more dataflows and resiliency data models, as shown in block 640 and 665. The one or more dataflows illustrate the flow of data between one or more resources of the entity and also provide information associated with the directionality of data flow. It should be understood that in some large entities the flow of data, and the types of data may be constantly changing, as such, the dataflows may also be constantly changing. As such, the dataflows and/or the enhanced data controls may be updated in real-time as the data is used by different resources throughout the entity.

The system may leverage artificial intelligence/machine learning model 670 to generate one or more enhanced data controls based on the data gathered from the one or more data sources as shown in block 645. Enhanced data controls may be controls that are associated with preventing the propagation of an event. The system transforms the data gathered from the one or more data sources via the artificial intelligence/machine learning model 670 and stores the transformed data in the technical repository 650, artifact repository 655, and a data resiliency repository 660. In the use phase, the system provides self-serving analytics 675, resiliency reports 680, and automated restoral plans 685 to the one or more users 110 in order to aid in the restoral of any corrupted data.

FIG. 7A provides a flowchart 700A illustrating process flows for determining occurrence of one or more events by performing rule-based analysis, in accordance with embodiments of the invention. The process flow associated with rule-based analysis is explained in blocks 710 through 740. As shown in block 710, the system determines the occurrence of an anomaly based on the one or more dataflows. The system may continuously receive data from the one or more data sources and may generate one or more dataflows in real-time continuously. The system may then monitor the one or more dataflows in real-time to detect anomalies. The anomaly may be a change in the regular flow of data between the one or more resources or a change associated with the one or more resources. The anomaly may be in the direction of the flow (e.g., data flowing in a reverse direction), it may be the flow of data to a new resource, it may be new data flowing to a current resource, new data flowing to a new resource, or the like. As such, the rule-based analysis may look for any flow of data that is outside of the how data typically flows within the entity. For example, the system may determine from the gathered data that data transfer between a resource 'A' and a resource 'B' happens only once every day and if the system identifies initiation of data flow in real-time between the resource 'A' and the resource 'B' for a second time in one single day, the system determines such data transfer as an anomaly. The one or more rules may be defined by the user 110 and/or the entity system 200. The one or more rules may be based on historical data movement within the entity, the importance of the data, the security around the data, the users that have access to the data, or the like.

As shown in block 720, the system determines if the change that caused the anomaly is linked with any change ticket. For example, the anomaly may be the result of a new resource being used, new data being used by an old resource, an updated process for sending and/or receiving data, or the like. As such, the anomaly may be explained by a ticket within the entity that approved the anomaly detected. Continuing with the previous example, if the resource 'B' needs a software update because of a technical issue, a user 110 may open a change ticket to report the technical issue to the system 100, entity system 200, and/or other users. As a part of the issue resolving process, the user 110, the system 300, and/or the entity system 200 may initiate a data transfer to resource 'B' from resource 'A.' In such a case, the system may determine that the anomaly detected in the above example is associated with the change ticket opened by the user and determines that the anomaly is not associated with an event. In such embodiments, the process flow proceeds to block 730, where the system continues monitoring the one or more dataflows to detect anomalies. In a case where the system is unable to identify any change ticket associated with the anomaly detected by the system, the system determines that the anomaly is associated with an event that may include data corruption, as shown in block 740. It some embodiments, when no ticket is identified, the occurrence of the anomality and the failure to identify a related ticket may be due to a user failing to open a ticket. As such, in some embodiments after a determination is made that no ticket exists, additional analysis of the anomaly may be required before determining that the anomaly includes data corruption.

FIG. 7B provides a flowchart 700B illustrating process flows for determining occurrence of one or more events by performing time series analysis, in accordance with embodiments of the invention. The process flow associated with time-series analysis is explained in blocks 750 through 770.

As shown in block 750, the system determines normal volumes, duration, and timings from the one or more dataflows. Once the data is gathered from the one or more data sources, the system may analyze the data to identify normal volumes, durations, and timings of the flow of data between one or more resources of the entity. For example, the system may determine that a data transfer between a resource 'A' and a resource 'B' happens every day at 12 AM. In another example, the system may determine that a data transfer between a resource 'A' and a resource 'B' typically takes 2 hours. In another example, the system may determine that 10 gigabytes data transfer typically happens between a resource 'A' and a resource 'B'. The system may analyze the data to establish normal standards associated with each of the one or more resources of the entity.

As shown in block 760, the system determines a deviation in the normal volumes, duration, and timings. The system may continuously monitor data from the one or more data sources in real-time to determine a deviation from the normal patterns of volumes, duration, and timings. For example, if the volume of data exchanged between a resource 'A' and a resource 'B' is 10 gigabytes every day and based on monitoring the real-time data from the one or more data sources, if the system identifies a data flow of 100 gigabytes between the resource 'A' and the resource 'B' in real-time, the system may determine such dataflow as an anomaly. In response to determining a deviation from the normal volumes, duration, and timing, the system determines occurrence of an event as shown in block 770. The determination of the occurrence of an event may be made automatically based on the determination of the anomaly, may occur after further automatic or manual analysis of the anomaly (e.g., a closer look at the type of data being transferred, the user accessing the application during the transfer, or the like), based on the combination of the anomaly with other events within the entity (e.g., an indication of unauthorized access to an application, or the like), or the like.

FIG. 8 provides a flowchart 800 illustrating the process flow for containing the impact of the one or more events, in accordance with an embodiment of the invention. As shown in block 810, the system in response to determining occurrence of an event, generates one or more propagation models (or otherwise accessed stored propagation models) based on the one or more dataflows. Based on the one or more dataflows, the system determines propagation of harmful content associated with the event, as shown in block 820. The one or more propagation models may be past propagation models previously crated for a particular data flow, may be an update of a past propagation model, or a newly generated propagation model created by the system based on the one or more dataflows. For example, the system, based on the data gathered from the one or more data sources, identifies that (i) a third application is dependent on a first application and a second application, (ii) the first application propagates data to the third application at a scheduled time T1 and the second application propagates data to the third application at a scheduled time T2, and (iii) the third application is performing calculations and is transmitting data in real-time to a fourth application based on the network traffic data and generates a propagation model that illustrates the dataflow between the first application, the second application, third application, and the fourth application which in turn illustrates the propagation of harmful content, or corrupted data caused by the harmful content, between the first application, the second application, the third application, and the fourth application if an event is associated with any of these applications. It should be understood that the propagation model may not only be based on the flow of data between applications, but the timing of the flow. For example, if data is only transferred between some applications nightly, some corrupted data may not have been filtered to some applications if the data corruption was identified before the transfer at the end of the day.

Next, as shown in block 830, the system determines impact associated with the propagation of the harmful content based on the one or more propagation models. As shown in block 840, the system performs one or more actions to contain the propagation of harmful content. The one or more actions may include, but are not limited to, generating and transmitting one or more alerts, decommissioning a resource, cancelling a scheduled data transfer, delaying a scheduled data transfer, bringing back-up resources online, or the like. For example, if a resource 'A' propagates data to resource 'C' and resource 'B' and resource 'B' propagates data to resource 'D' which in turn propagates data to resource 'C.' If the propagation between resource 'A' and resource 'B' happens for every two hours, the propagation between resource 'A' and resource 'C' happens for every twelve hours, the propagation between resource 'B' and resource 'D' happens for every four hours, and the propagation between resource 'D' and resource 'C' happens for every four hours. The system identifies that two paths exist between resource 'A' and resource 'C,' where the first path is the direct path between resource 'A' and resource 'C' and the second path comprises propagation from resource 'A' to resource 'B,' resource 'B' to resource 'D,' and resource 'D' to resource 'C.' The system identifies that resource 'C' may be impacted by the longer path earlier than the direct path based on provisioning frequency. The system may identify high impact paths and generate and prioritize one or more alerts based on the high impact paths, where a user may perform mitigation steps based on the alerts to rectify the resources associated with the high impact path first. In some embodiments, the system may automatically perform one or more mitigation steps explained above. In some embodiments, the system may automatically enforce the one or more controls generated in block 645 of FIG. 6 to contain the propagation of the harmful content and mitigate the impacts of the events.

In response to identifying the occurrence of the event and containing the impacts of the event as explained above, the system restores the data and allows the one or more resources to return to normal as explained with respect to FIG. 9 and FIG. 10. FIG. 9 provides a flowchart 900 illustrating the process flow for identifying and retrieving a last good copy of the data, in accordance with an embodiment of the invention. The last good copy of the data may be based on a number of factors including completeness (e.g., does it include all of the data), accuracy (e.g., is the data in the copy accurate), timeliness (e.g., can it be retrieved or replicated quickly), impacted data (e.g., what type of data is impacted), availability (e.g., can it be accessed by the entity), recovery objectives (e.g., is all the data, a subset of the data, or the like needed), or the like. The last good copy of data may be in the form of true back-up data, images of the data, abbreviated data, subsets of the full data set, or the like. As such, the last good copy of the data may be the complete data set or something that can be recreated into the full dataset.

As shown in block 910, the system identifies one or more options for retrieving a last good copy from a metadata inventory. The one or more options may comprise a backup copy, copy of data from the third party system (e.g., a vendor, or the like), data copy from an upstream resource, data previously transferred to a downstream resource, a snapshot of a most recent copy of data, or the like, and/or any combinations of the foregoing. The one or more options may be generated by the system based on the stored metadata associated with the one or more resources and where the stored metadata is gathered from the one or more data sources.

In response to identifying the one or more options, the system determines if a most viable option exists from the one or more options as shown in block 920. The most viable option may be determined based in part on the factors previously discussed herein (e.g., completeness, accuracy, timeliness, impacted data, availability, recovery objectives, or the like. For example, if one or more options comprise a backup copy and a copy of data from the third party system, the backup copy that is stored by the entity system 200 is preferred over a copy of data from the third party system. In such instances, the system may determine that the backup copy is the most viable option. In response to determining that the most viable option exists, the process flow proceeds to block 930, where the system retrieves the last good copy from the most viable option. Next, as shown in block 940, the system validates the last good copy. In some embodiments the system may determine if the data can be recreated. For example, the system may validate that the backup data is complete and that there were no interruptions while performing saving the backup copy.

In some embodiments, the system may determine that the most viable option does not exist and the system may determine that recreation of data is not possible as shown in block 960. For example, the one or more options associated with the last good copy of data may comprise just a snapshot of the most recent copy of data. In such a case, the system may not be able to use the snapshot of the most recent copy of data to completely restore the data and may determine that the most viable option does not exist. In such embodiments, the system assesses impacts of data loss as shown in block 970. The system may provide analytics (e.g., self-serving analytics 675) and insights associated with data loss and gaps created because of the data loss to a user 110 via a dashboard. In some embodiments, the user 110 may take one or more decisions associated with the analytics and insights generated by the system based on the assessment of impacts of data loss. In some other embodiments, the system automatically takes the one or more decisions based on the historical decisions taken by the user 110.

FIG. 10 provides a flowchart 1000 illustrating the process flow for restoring data using the last good copy, in accordance with an embodiment of the invention. As shown in block 1010, the system confirms an approach for restoration of data. The approach associated with restoration of data may be defined by the entity and/or a user 110. In some embodiments, the system automatically determines an approach based on the type of the most viable option selected by the system in blocks 920, 930, and 940 of FIG. 9. For example, the system may determine that restoring the downstream resources first and then proceeding to the upstream resources would be the most efficient approach for restoring the data associated with one or more resources. Next, as shown in block 1020, the system determines one or more restoral activities associated with the approach. For example, the one or more restoral activities may comprise at least testing of the most viable option to determine that the most viable option is not introducing an errors in the one or more resources. In another example, the one or more restoral activities may comprise identifying a right sequence for restoring (e.g., restoring application A and application B at the same time with the same data copy and then updating other applications that are upstream/downstream to application A and application B).

Next, as shown in block 1030, the system verifies that the one or more restoral activities do not cause any synchronization issues. In response to determining that the one or more restoral activities do not cause any synchronization issues, the system performs the one or more restoral activities, as shown in block 1040. As shown in block 1050, the system validates data after completing the restoration. As shown in block 1060, the system reactivates data flow. For example, the system may restore an application and may reactivate the data flow associated with the application by connecting the application to upstream and downstream applications.

In some embodiments, the system provides a platform that comprises a dashboard, where one or more users 110 utilize the platform to monitor real-time data, identify occurrence of the events, analyze the impacts of the events, and provide one or more inputs to the system. The platform allows the one or more users 110 to review the one or more data models, one or more resiliency models, one or more propagation models, alerts, reports, and other analytics provided by the system. In such embodiments, the one or more users may use the platform provided by the system to actively analyze health of the one or more resources and predict vulnerabilities associated with the one or more resources.

As will be appreciated by one of skill in the art, the present invention may be embodied as a method (including, for example, a computer-implemented process, a business process, and/or any other process), apparatus (including, for example, a system, machine, device, computer program product, and/or the like), or a combination of the foregoing. Accordingly, embodiments of the present invention may take the form of an entirely hardware embodiment, an entirely software embodiment (including firmware, resident software, micro-code, and the like), or an embodiment combining software and hardware aspects that may generally be referred to herein as a "system." Furthermore, embodiments of the present invention may take the form of a computer program product on a computer-readable medium having computer-executable program code embodied in the medium.

Any suitable transitory or non-transitory computer readable medium may be utilized. The computer readable medium may be, for example but not limited to, an electronic, magnetic, optical, electromagnetic, infrared, or semiconductor system, apparatus, or device. More specific examples of the computer readable medium include, but are not limited to, the following: an electrical connection having one or more wires; a tangible storage medium such as a portable computer diskette, a hard disk, a random access memory (RAM), a read-only memory (ROM), an erasable programmable read-only memory (EPROM or Flash memory), a compact disc read-only memory (CD-ROM), or other optical or magnetic storage device.

In the context of this document, a computer readable medium may be any medium that can contain, store, communicate, or transport the program for use by or in connection with the instruction execution system, apparatus, or device. The computer usable program code may be transmitted using any appropriate medium, including but not limited to the Internet, wireline, optical fiber cable, radio frequency (RF) signals, or other mediums.

Computer-executable program code for carrying out operations of embodiments of the present invention may be written in an object oriented, scripted or unscripted programming language such as Java, Perl, Smalltalk, C++, or the like. However, the computer program code for carrying out operations of embodiments of the present invention may also be written in conventional procedural programming languages, such as the "C" programming language or similar programming languages.

Embodiments of the present invention are described above with reference to flowchart illustrations and/or block diagrams of methods, apparatus (systems), and computer program products. It will be understood that each block of the flowchart illustrations and/or block diagrams, and/or combinations of blocks in the flowchart illustrations and/or block diagrams, can be implemented by computer-executable program code portions. These computer-executable program code portions may be provided to a processor of a general purpose computer, special purpose computer, or other programmable data processing apparatus to produce a particular machine, such that the code portions, which execute via the processor of the computer or other programmable data processing apparatus, create mechanisms for implementing the functions/acts specified in the flowchart and/or block diagram block or blocks.

These computer-executable program code portions may also be stored in a computer-readable memory that can direct a computer or other programmable data processing apparatus to function in a particular manner, such that the code portions stored in the computer readable memory produce an article of manufacture including instruction mechanisms which implement the function/act specified in the flowchart and/or block diagram block(s).

The computer-executable program code may also be loaded onto a computer or other programmable data processing apparatus to cause a series of operational steps to be performed on the computer or other programmable apparatus to produce a computer-implemented process such that the code portions which execute on the computer or other programmable apparatus provide steps for implementing the functions/acts specified in the flowchart and/or block diagram block(s). Alternatively, computer program implemented steps or acts may be combined with operator or human implemented steps or acts in order to carry out an embodiment of the invention.

As the phrase is used herein, a processor may be "configured to" perform a certain function in a variety of ways, including, for example, by having one or more general-purpose circuits perform the function by executing particular computer-executable program code embodied in computer-readable medium, and/or by having one or more application-specific circuits perform the function.

Embodiments of the present invention are described above with reference to flowcharts and/or block diagrams. It will be understood that steps of the processes described herein may be performed in orders different than those illustrated in the flowcharts. In other words, the processes represented by the blocks of a flowchart may, in some embodiments, be in performed in an order other that the order illustrated, may be combined or divided, or may be performed simultaneously. It will also be understood that the blocks of the block diagrams illustrated, in some embodiments, merely conceptual delineations between systems and one or more of the systems illustrated by a block in the block diagrams may be combined or share hardware and/or software with another one or more of the systems illustrated by a block in the block diagrams. Likewise, a device, system, apparatus, and/or the like may be made up of one or more devices, systems, apparatuses, and/or the like. For example, where a processor is illustrated or described herein, the processor may be made up of a plurality of microprocessors or other processing devices which may or may not be coupled to one another. Likewise, where a memory is illustrated or described herein, the memory may be made up of a plurality of memory devices which may or may not be coupled to one another.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

The invention claimed is:

1. A system for identifying occurrence of events and performing one or more actions to mitigate impacts of the events, the system comprising:
   at least one network communication interface;
   at least one non-transitory storage device; and
   at least one processing device coupled to the at least one non-transitory storage device and the at least one network communication interface, wherein the at least one processing device is configured to:
   identify an anomaly based on one or more indicators and one or more dataflows;
   in response to identifying the anomaly, determine occurrence of an event and generate one or more propagation models associated with the event;
   perform event impact analysis based on the one or more propagation models;
   perform one or more actions to contain the event based on the one or more propagation models;
   identify a last good copy of data;
   retrieve the last good copy of data; and
   restore the last good copy of data, wherein restoring the last good copy of data further comprises:
      confirming an approach for restoring the last good copy of data;
      determining one or more restoral activities associated with the approach;
      verifying that the one or more restoral activities do not cause any synchronization issues;
      performing the one or more restoral activities;
      performing validation after performing the one or more restoral activities; and
      determining that the validation is successful and activate at least one dataflow of the one or more dataflows.

2. The system of claim 1, wherein the at least one processing device is configured to:
   gather data from one or more data sources of an entity; and
   generate one or more dataflows using the data gathered from the one or more data sources.

3. The system of claim 1, wherein the at least one processing device is configured to monitor the one or more dataflows to establish one or more standards associated with the one or more dataflows.

4. The system of claim 3, wherein the at least one processing device is configured to identify the anomaly based on performing rule-based analysis, wherein performing the rule-based analysis comprises:
continuously monitoring the one or more dataflows in real-time;
determining a deviation in the one or more standards associated with the one or more dataflows, wherein the deviation in the one or more standards is associated with at least one of direction, frequency, source, destination, and datatype of the one or more dataflows; and
identifying occurrence of the anomaly based on determining the deviation.

5. The system of claim 4, wherein the at least one processing device is configured to identify the occurrence of the anomaly based on determining that the deviation is not associated with a change ticket.

6. The system of claim 3, wherein the at least one processing device is configured to identify the anomaly based on performing time-series analysis, wherein performing the time-series analysis comprises:
continuously monitoring the one or more dataflows in real-time;
determining a deviation in the one or more standards associated with the one or more dataflows, wherein the deviation is associated with at least one of volume, duration, and timings of the one or more dataflows; and
identifying occurrence of the anomaly based on determining the deviation.

7. The system of claim 1, wherein performing the event impact analysis further comprises:
determining propagation of harmful content associated with the event based on the one or more propagation models; and
determining impact associated with the propagation of the harmful content.

8. The system of claim 1, wherein the at least one processing device is configured to:
identify one or more options for retrieving the last good copy of data from a metadata inventory;
determine that a most viable option exists for retrieving the last good copy of data from the one or more options;
retrieve the last good copy of data from the most viable option; and
validate the last good copy of data before restoring the last good copy of data.

9. The system of claim 1, wherein the at least one processing device is configured to:
identify one or more options for retrieving the last good copy from a metadata inventory;
determine that a most viable option does not exist for retrieving the last good copy from the one or more options;
determine that recreation of data is not possible based on determining that the most viable option does not exist; and
provide information associated with the event and the one or more options to one or more users via a dashboard.

10. The system of claim 1, wherein the at least one processing device is configured to perform the one or more restoral activities in a sequence.

11. A computer program product for identifying occurrence of events and performing one or more actions to mitigate impacts of the events, the computer program product comprising a non-transitory computer-readable storage medium having computer executable instructions for causing a computer processor to perform the steps of:
identifying an anomaly based on one or more indicators and one or more dataflows;
in response to identifying the anomaly, determining occurrence of an event and generate one or more propagation models associated with the event;
performing event impact analysis based on the one or more propagation models;
performing one or more actions to contain the event based on the one or more propagation models;
identifying a last good copy of data;
retrieving the last good copy of data; and
restoring the last good copy of data, wherein restoring the last good copy of data further comprises:
confirming an approach for restoring the last good copy of data;
determining one or more restoral activities associated with the approach;
verifying that the one or more restoral activities do not cause any synchronization issues;
performing the one or more restoral activities;
performing validation after performing the one or more restoral activities; and
determining that the validation is successful and activate at least one dataflow of the one or more dataflows.

12. The computer program product of claim 11, wherein the computer executable instructions cause a computer processor to perform the steps of:
gathering data from one or more data sources of an entity; and
generating one or more dataflows using the data gathered from the one or more data sources.

13. The computer program product of claim 11, wherein the computer executable instructions cause a computer processor to perform the step of monitoring the one or more dataflows to establish one or more standards associated with the one or more dataflows.

14. The computer program product of claim 13, wherein the computer executable instructions cause a computer processor to perform the step of identifying the anomaly based on performing rule-based analysis, wherein performing the rule-based analysis comprises:
continuously monitoring the one or more dataflows in real-time;
determining a deviation in the one or more standards associated with the one or more dataflows, wherein the deviation in the one or more standards is associated with at least one of direction, frequency, source, destination, and datatype of the one or more dataflows; and
identifying occurrence of the anomaly based on determining the deviation.

15. The computer program product of claim 13, wherein the computer executable instructions cause a computer processor to perform the step of identifying the anomaly based on performing time-series analysis, wherein performing the time-series analysis comprises:
continuously monitoring the one or more dataflows in real-time;
determining a deviation in the one or more standards associated with the one or more dataflows, wherein the deviation is associated with at least one of volume, duration, and timings of the one or more dataflows; and identifying occurrence of the anomaly based on determining the deviation.

16. The computer program product of claim 11, wherein performing the event impact analysis further comprises:
   determining propagation of harmful content associated with the event based on the one or more propagation models; and
   determining impact associated with the propagation of the harmful content.

17. The computer program product of claim 11, wherein the computer executable instructions cause a computer processor to perform the steps of:
   identifying one or more options for retrieving the last good copy of data from a metadata inventory;
   determining that a most viable option exists for retrieving the last good copy of data from the one or more options;
   retrieving the last good copy of data from the most viable option; and
   validating the last good copy of data before restoring the last good copy of data.

18. The computer program product of claim 11, wherein the computer executable instructions cause a computer processor to perform the steps of:
   identifying one or more options for retrieving the last good copy from a metadata inventory;
   determining that a most viable option does not exist for retrieving the last good copy from the one or more options;
   determining that recreation of data is not possible based on determining that the most viable option does not exist; and
   providing information associated with the event and the one or more options to one or more users via a dashboard.

19. A computer implemented method for identifying occurrence of events and performing one or more actions to mitigate impacts of the events, the method comprising:
   identifying an anomaly based on one or more indicators and one or more dataflows;
   in response to identifying the anomaly, determining occurrence of an event and generate one or more propagation models associated with the event;
   performing event impact analysis based on the one or more propagation models;
   performing one or more actions to contain the event based on the one or more propagation models;
   identifying a last good copy of data;
   retrieving the last good copy of data; and
   restoring the last good copy of data, wherein restoring the last good copy of data further comprises:
      confirming an approach for restoring the last good copy of data;
      determining one or more restoral activities associated with the approach;
      verifying that the one or more restoral activities do not cause any synchronization issues;
      performing the one or more restoral activities;
      performing validation after performing the one or more restoral activities; and
      determining that the validation is successful and activate at least one dataflow of the one or more dataflows.

* * * * *